United States Patent
Machón et al.

(10) Patent No.: US 11,479,723 B2
(45) Date of Patent: Oct. 25, 2022

(54) APPARATUS AND METHOD FOR THERMALLY DEMANUFACTURING TIRES AND OTHER WASTE PRODUCTS

(71) Applicant: PRTI Global Management, LLC, Franklinton, NC (US)

(72) Inventors: Wayne Machón, Franklinton, NC (US); Brian Seguin, Franklinton, NC (US); Alan Krauss, Franklinton, NC (US)

(73) Assignee: PRTI Global Management, LLC, Franklinton, NC (US)

( * ) Notice: Subject to any disclaimer, the term of this patent is extended or adjusted under 35 U.S.C. 154(b) by 0 days.

(21) Appl. No.: 17/682,704

(22) Filed: Feb. 28, 2022

(65) Prior Publication Data
US 2022/0275166 A1 Sep. 1, 2022

Related U.S. Application Data

(60) Provisional application No. 63/155,140, filed on Mar. 1, 2021.

(51) Int. Cl.
| | |
|---|---|
| *C10B 1/04* | (2006.01) |
| *C08J 11/12* | (2006.01) |
| *C10B 53/07* | (2006.01) |
| *C10B 49/02* | (2006.01) |
| *C10B 47/06* | (2006.01) |
| *C10B 51/00* | (2006.01) |

(52) U.S. Cl.
CPC .............. *C10B 1/04* (2013.01); *C08J 11/12* (2013.01); *C10B 53/07* (2013.01); *C08J 2321/00* (2013.01); *C10B 47/06* (2013.01); *C10B 49/02* (2013.01); *C10B 51/00* (2013.01)

(58) Field of Classification Search
CPC ........... C10B 1/04; C10B 47/06; C10B 49/02; C10B 51/00; C10B 53/07; C08J 11/12; C08J 2321/00
See application file for complete search history.

(56) References Cited

U.S. PATENT DOCUMENTS

| | | | | |
|---|---|---|---|---|
| 2,131,702 | A | * | 9/1938 | Berry ........................ C10B 1/04 201/43 |
| 2,317,491 | A | * | 4/1943 | Solakian .................. C08J 11/14 422/208 |
| 4,452,154 | A | * | 6/1984 | Kono ...................... B29B 17/04 201/34 |
| 5,302,115 | A | * | 4/1994 | Hagar ..................... F23C 7/004 431/182 |
| 5,370,715 | A | * | 12/1994 | Kortzeborn ............... C10B 1/04 48/209 |

(Continued)

*Primary Examiner* — Jonathan Miller
(74) *Attorney, Agent, or Firm* — David S. Bradin; Nexsen Pruet, PLLC

(57) ABSTRACT

An apparatus and process for thermally de-manufacturing tires and other materials. The apparatus is a retort chamber with various zones in which tires are combusted to provide energy for the thermal depolymerization reaction, depolymerization takes place, and products leave the retort chamber. In one embodiment, the process reacts water with iron present in steel-belted tires to produce hydrogen, which helps to break sulfur-sulfur bonds in vulcanized materials. The water also helps control the temperature of the reaction, which allows for control over the types and relative amounts of the various depolymerization products.

26 Claims, 5 Drawing Sheets

(56) References Cited

U.S. PATENT DOCUMENTS

| | | | | |
|---|---|---|---|---|
| 5,435,890 A * | 7/1995 | Munger | ............... | C10G 1/10 |
| | | | | 202/112 |
| 10,329,400 B2 * | 6/2019 | Machon | ............... | B01D 45/16 |
| 10,703,876 B2 * | 7/2020 | Machon | ............... | C10B 49/02 |
| 2006/0163053 A1 * | 7/2006 | Ershag | ............... | C10B 47/16 |
| | | | | 202/109 |
| 2010/0143852 A1 * | 6/2010 | Waltz | ............... | F23L 9/02 |
| | | | | 110/297 |
| 2014/0045132 A1 * | 2/2014 | Gouv a de Miranda | ............... | |
| | | | | F23D 91/00 |
| | | | | 432/92 |
| 2015/0144476 A1 * | 5/2015 | Anigurkin | ............... | C10B 49/04 |
| | | | | 202/121 |
| 2018/0244889 A1 * | 8/2018 | Machon | ............... | B29B 17/02 |

\* cited by examiner

_US 11,479,723 B2_

APPARATUS AND METHOD FOR THERMALLY DEMANUFACTURING TIRES AND OTHER WASTE PRODUCTS

CROSS REFERENCE TO RELATED APPLICATIONS

This application is a U.S. application which claims the benefit of U.S. Provisional Application No. 63/155,140, filed Mar. 1, 2021; the entire disclosure of which is incorporated herein by reference in their entirety.

FIELD OF THE INVENTION

The present invention relates to an apparatus and method for thermally de-manufacturing post-consumer and/or post-industrial rubber and/or plastic products, such as tires.

BACKGROUND OF THE INVENTION

There is a large interest in recycling waste materials, rather than storing them in landfills. This is particularly true with respect to used tires, a post-consumer waste product, and waste materials resulting from tire manufacture, a post-industrial waste product. Combustion of these materials can produce harmful gases, as they include sulfur crosslinks (a process known as vulcanization), which form hydrogen sulfide on combustion.

There are a variety of processes for depolymerizing the rubber in used tires, including those disclosed in EP 0694600 and U.S. Pat. No. 7,628,892. EP 0694600 discloses a process and a plant where used tires are depolymerized at relatively low pressure, and at a temperature between 100 and 135° C., to form gas and liquid products, which are subsequently combusted. The temperature is maintained by introducing water and air in the device.

U.S. Pat. No. 7,628,892 discloses a plant that includes a depolymerizing device, with a substantially cylindrical body, with an upper base, and a lower base. Thermal depolymerization of tires occurs inside the device, and a product mixture exits the device from an exit port at the top of a retort chamber, and then enters a phase separator, to separate out liquid products from gaseous products. The phase separator is connected to an aspiration unit, which enables the depolymerizing device to operate at pressures up to 10 mBar lower than atmospheric pressure. The process purportedly produces a carbonaceous fuel product, and a gaseous product which is burned.

The '892 patent also discloses adding calcium oxide to tires, such that, as the rubber in the tires is depolymerized in the presence of steam, the calcium oxide is converted to calcium hydroxide, which then reacts with sulfur, and forms a salt that then mixes with the steel and carbon recovered from the depolymerization process.

U.S. Pat. No. 10,703,876 also discloses a retort chamber for use in depolymerizing tires. Unlike the '892 patent, which discloses an apparatus where a vacuum is pulled at, and gaseous products leave from, the very top of the retort chamber, the retort chamber in the '876 patent has a vacuum line disposed a vacuum line or aspirator located in the upper third of the retort chamber. This apparatus has proven to be very efficient at depolymerizing tires.

The retort chamber in the '876 patent flows oxygen or air into the bottom of the retort chamber, enabling the lower-most tire to burn and generate the heat required to thermally depolymerize the tires overlying the lower-most tire.

The thermal depolymerization products include syngas, among other gaseous, liquid and solid products. The process works well when the cycle time is around 16 hours, but when efforts were made to decrease the cycle time to around 11 hours, the oxygen introduced through the bottom of the retort chamber and the syngas produced by the depolymerization of the tires mixed before reaching the upper third of the retort chamber, where the gases would be removed. At the temperatures at which the depolymerization occurred, the mixture of gases posed a risk of explosion. Accordingly, efforts have been made by the present inventors to improve on the apparatus in order to carry out a quicker cycle time.

The '876 patent further disclosed embodiments where a desulfurization unit, attached to the port, was used to remove sulfur from products while leave the retort chamber in the gas phase. While this can be effective, tires include a fair amount of solids, such as carbon black. When the product mixture is flowed through a desulfurization unit in the gas phase, this can result in the rapid removal of particulate matter, such as carbon black, which can plug up the pipes and lead to the generation of excess pressure in the retort chamber. There exists a need for additional processes for treating the depolymerization products as they leave the retort chamber.

It would be advantageous to provide improved devices and processes for thermally de-manufacturing tires and other waste streams, which allow for more rapid cycle times, in order to process more waste material in the same timeframe, in a similarly sized apparatus. The present application discloses such devices and processes.

SUMMARY OF THE INVENTION

In one embodiment, an apparatus for thermally de-manufacturing used tires, waste material from tire manufacture, and other post-consumer and post-industrial waste is disclosed.

In some aspects of this embodiment, the apparatus for carrying out thermal de-manufacturing is coupled to a second apparatus for performing product isolation and/or separation of the products resulting from the thermal de-manufacturing process.

The term "thermally de-manufacturing" refers to the thermal depolymerization of polymeric materials, and also to the de-manufacturing of non-polymeric components. By way of example, where a tire is thermally de-manufactured, it is possible to isolate organic materials produced as a result of the depolymerization process, and also inorganic materials, such as steel from steel belts, and sulfur used in the vulcanization process, where the sulfur can be isolated in the form of sulfur-containing compounds. Where inorganic fillers are used in filled polymeric articles of manufacture, the fillers can be isolated separately from the thermally depolymerized articles of manufacture.

The thermal de-manufacturing apparatus comprises a retort chamber (also referred to herein as a retort), which, preferably, is oriented off the horizontal plane (e.g., in the vertical direction). The retort chamber can be of any desired shape, for example, a cylindrical or conical shape, with a diameter between about 1.5 and about 24 feet, more typically between about 4 and about 8 feet. The height of the retort chamber is typically between about 5 and 30 feet. The side walls of the retort chamber may be insulated to help maintain the operating temperature and to protect the metal of the chamber walls from exposure to excessive temperatures.

Further, as discussed in more detail below, combustion or partial combustion of materials at or near the bottom of the retort chamber, for example, from about 0 to about 5% of the height of the retort chamber, from about 0 to about 10% of the height of the retort chamber, from about 0 to about 15% of the height of the retort chamber, or from about 0 to about 20% of the height of the retort chamber, can advantageously provide heat energy for carrying out thermal depolymerization at a position higher up in the retort chamber. When is substantially vertical, it allows for material to flow downward as combustion or partial combustion takes place.

The inside of the retort chamber includes four different temperature zones, the locations of which can vary depending on a variety of factors, such as the oxygen and water content in the retort chamber, the reaction temperature and pressure, and the type of material being de-manufactured.

Briefly, it requires a significant amount of heat energy to initiate the thermal depolymerization of polymeric materials, such as tires. In some embodiments, this heat is provided externally, by heating the outside of the retort chamber, or, alternatively, by using microwave energy. In other embodiments, the heat energy is provided by partial combustion of tires or other polymeric materials at or near the bottom of the retort chamber. Partial combustion requires at least some oxygen, though the amount of oxygen added is purposefully kept below a stoichiometric amount required to fully combust the tires. Heat rises, and the heat produced by partially combusting a portion of the material at or near the bottom of the retort chamber rises up the retort chamber and provides the energy needed to depolymerize the tires and/or other polymeric materials present above the portion of the retort chamber heat is produced. Where water is added, it can be used to control the amount of heat, and the water may also react in the presence of high temperatures and, in some embodiments, steel from the tires, to form oxygen and hydrogen. The hydrogen can assist in de-vulcanizing the rubber in tires, forming hydrogen sulfide or other sulfur compounds, and can hydrogenate any olefinic compounds that might be present. Catalysts can be added, if desired, to lower the activation energy required for those further reactions in which monomers and/or oligomers produced in the depolymerization process may participate.

The composition of the materials being depolymerized, the temperature, pressure, and flow rate in the zone of the retort chamber in which these olefinic products are formed, and the presence or absence of catalysts, hydrogen, and/or water, can affect the product mixtures formed as the materials are depolymerized and initial products participate process steps.

In the first zone, which is at or near the bottom of the retort chamber, material is heated to a temperature between about 150 and about 550° C., more typically between about 150 and about 400° C. or about 250 and about 550° C., and combusted or partially combusted. Water, a catalyst, and/or oxygen can optionally be provided. Where oxygen is provided, it can be provided, for example, in pure form or as air, through a valve at or near the bottom of the retort chamber. Heat can be provided, for example, by introducing a burner through an opening in the wall of the retort chamber, at or near the bottom of the retort chamber. The heat produced by the combusting/partially-combusting the material is then used to reach a desired depolymerization temperature. Alternatively, the heat energy can be provided by providing the bottom of the retort chamber with a layer of refractory material, and heating the refractory material to a desired temperature using any of a variety of different heaters, such as induction heaters. In other embodiments, microwave energy is used to depolymerize the tires and/or other materials.

In one embodiment, the bottom of the retort chamber includes a series of registers, where oxygen and, optionally, water and/or a catalyst is introduced at one end of the series of registers, and flame from a burner is introduced at the other end of the series of registers. The burner can be placed on a carriage, which facilitates its movement through the retort. The registers are spaced so as to provide substantially equal pressure along the entire bottom of the retort. By "substantially equal" is meant that the pressure along the bottom of the retort chamber does not vary by more than 20%.

In operation, the reaction is moved toward the center of the bottom of the retort chamber, which provides a relatively constant rate of combustion to the materials being combusted, in contrast with merely introducing the burner to one end of the register.

In the first embodiment, a number of ports are provided to permit the input of one or more of oxygen (for example, in pure form or as air), water, and/or catalysts, and the output of products, and to measure and manage rate of flow, temperature, and pressure.

In the second embodiment, a number of input and output ports are used to create multiple zones for the refinement of solid, liquid and vapor, thus creating multiple products.

In some embodiments, sulfur used to vulcanize the rubber in the tires is removed inside of the retort chamber, such as by reaction with a compound which forms a sulfide salt, and in other embodiments, sulfur is present in the product stream, where it is optionally, but preferably, removed before products are isolated, after they are isolated, after they are flared, after they are combusted to produce electricity, or, in those embodiments where syngas is converted to other products, before the syngas contacts any catalysts, since sulfur tends to poison certain catalysts, such as those used to form olefins and paraffin wax.

In one embodiment, a desulfurization unit is attached to a flue, so that the products can be combusted to form electricity, and the gaseous by-products can then be subjected to desulfurization conditions as the flue gas exits to the atmosphere via the flue.

The top of the retort can be opened to load tires and/or other materials to be thermally de-manufactured into the retort. This can be accomplished by attaching the top to the remainder of the retort using a clam-shell hood, a hinge, a screw top, a series of flanges, and the like. However, in some embodiments, the top is a free-floating lid that can be lifted straight up, allowing for easy loading of the retort chamber when it is rotated about its axis.

It can be desirable, between batches, to cool down the retort. While, in operation, water is typically added to the retort from a valve at or near the bottom of the retort, during cooling operations, water can also be or alternatively be added from a valve at or near the top of the retort chamber. In various embodiments, the term "at or near the top" means, for example, from about 0 to about 5%, from about 0 to about 10%, from about 0 to about 15%, or from about 0 to about 20% from the top of the retort chamber.

This can significantly accelerate the cool-down process, which allows the next batch to be processed faster than if water is not added from the top of the retort chamber. While not wishing to be bound to a particular theory, it is believed that when tires are thermally depolymerized, iron present in the steel belts reacts with carbon monoxide formed as a result of incomplete combustion (i.e., by using less than stoichiometric oxygen) and the water that is introduced to form hydrogen, in a manner analogous to that in the "steam-iron" process. The thus-formed hydrogen can break sulfur-sulfur and carbon-sulfur linkages present in the vulcanized rubber used in tires, and form hydrogen sulfide and other sulfur-containing products (including, but not limited to, COS).

Between batches, it is desirable to remove the leftover material from the retort. In the case of tires, leftover material can include carbon black and steel from the steel belts in the tires. There are several ways to remove leftover material from the retort. One exemplary way is to provide a hinge on the bottom of the retort, and unhinge the bottom after the material has been thermally depolymerized, thereby removing the material from the retort. Another way is to provide a hinge with a horizontal axis around the middle of the retort, and a motor for rotating the retort. After the top is removed, the retort can be rotated around the horizontal axis of the hinge. Materials collected at the bottom of the retort then drop out of the top of the retort. The retort can then be rotated back to the vertical position, and any pipes, valves, or other connections which were disconnected in order to rotate the retort can be reconnected.

In use, the retort is opened and tires and/or other materials to be thermally de-manufactured are introduced into the retort. The lid is closed, and gases and other volatiles are purged out of the system in a safe manner. For example, nitrogen or carbon dioxide gas can be flowed into the retort, and flowed out of the retort along with gases and other volatiles. These compounds can be captured under pressure, released to the atmosphere, or flared. A low pressure (i.e., a vacuum) can then be applied. The system is completely sealed and no noxious or odor based vapors are permitted to escape.

The tires, or other material to be thermally depolymerized, that is at or near the bottom of the retort chamber is then heated up. Depending on the mechanism used to heat the material, this can involve introducing the burner to the bottom of the retort chamber, and bleeding in oxygen, water, and/or a catalyst through a valve so as to create a reaction with the material, or can involve introducing oxygen, water, and/or a catalyst to the bottom of the retort chamber, while also heating refractory material present at the bottom of the retort chamber.

The temperature in the retort is monitored. As the temperatures reach their appropriate ranges, gaseous products evolve from the port or ports. From there, the gaseous products can be subjected to a cyclone to remove particulates, a desulfurization step to remove hydrogen sulfide and other sulfur-containing products, and/or a cooling process to allow products which are liquid at room temperature to be separated from those which are gaseous at room temperature. The gaseous products can be collected and stored, burned, or used to generate electricity.

As the reaction proceeds, tires and/or other materials at or near the bottom of the retort chamber are consumed, and, using gravity, materials from higher above the consumed materials then proceed down the retort chamber until they are depolymerized.

After the reaction is complete, which can be judged, for example, by changes in temperature in the various zones, the reaction can be quenched, for example, by introducing water through a valve at or near the top of the retort chamber.

When the retort chamber has sufficiently cooled, the water can be drained. Ideally, the retort chamber is sealed during operations, so as to maintain the vacuum and comply with safety regulations. After each batch is complete, the seal can be broken, water drained from the retort chamber, and solid materials removed from the retort chamber.

In one embodiment, this involves opening a hinge at the bottom of the retort chamber to release the materials. In another embodiment, this involves removing the top, decoupling the outlet port, and rotating the retort around a hinge with a horizontal axis located at or near the middle of the retort. The materials then fall out of the top of the retort chamber, and the retort chamber can then be moved back to its original upright position.

The products obtained from thermally de-manufacturing tires tend to include carbon black, sulfur compounds, steel (from steel belts), a liquid, largely olefinic, fraction with properties similar to number 2 diesel, methane gas, a C fraction, and one or more additional gases, such as carbon dioxide, carbon monoxide, sulfur dioxide and hydrogen. One or more of the olefins in the olefinic fraction can further react, for example, by undergoing Diels-Alder reactions with dienes such as butadiene (formed, for example, from the depolymerization of nitrile-butadiene rubber) to form cycloaliphatics, olefin dimerization/trimerization/oligomerization (with the same olefins or with two or more different olefins) to form larger olefins, hydrogenation to form aliphatics, and aromatization reactions.

Removing the solid products from the retort chamber while they are still wet can facilitate the isolation of carbon black. Alternatively, or additionally, in some embodiments, a cyclone separator is used to remove particulates present in the vapor. In other embodiments, a cyclone separator is not used.

In addition to, or in place of tires, other materials that can be de-manufactured include Banbury sludge, medical waste, wood based waste, oil based waste, plant matter, animal waste, human waste, fish waste, computer waste, printed circuit boards, "fluff" from the demolition of cars and asphalt extender.

The products resulting from the thermal de-manufacturing of these materials will vary from those obtained from tires, and the operating temperatures may be varied as well, depending on the appropriate temperatures at which the polymers undergo thermal depolymerization. Once the products are produced in the retort, they can be isolated and, ideally, separated into two or more different products.

In some embodiments, the retort is attached to a product separation unit, which in some embodiments includes one or more cooling towers, distillation towers, chillers, curtains of liquid through which gaseous streams can pass, and the like, to cool down the gas and separate the product mixture into one or more liquid and one or more gaseous products. The retort can be connected to the product separation unit, for example, via the vacuum line located around 40-60% of the distance between the bottom and top of the retort chamber, and a position at or near the bottom of the product separation unit.

The products exiting the retort are in the gas phase, and at an elevated temperature. When cooled to room temperature, some products are liquid, and others are gaseous. In some embodiments, the gas phase products leaving the retort chamber are passed through the bottom of the product separation unit, where they rise toward the top of the unit.

In one specific embodiment, one or more curtains of water are used to cool the gaseous product stream to a relatively lower temperature than when they leave the retort chamber. A falling curtain of water (and/or oil) drops or droplets, which originates at or near the top of the product separation unit, falls downward, as the gaseous products progress upward. As the gaseous products, which include particulates, and compounds which are liquid at relatively lower temperatures, contact the water and/or oil drops or droplets in the falling curtain, the gas cools down, and liquid products and particulate matter are trapped.

The curtains of water can be formed, for example, using spray nozzles. In some embodiments, spray nozzles are present on a 12-16" pipe, positioned at least about 4" from the top of the product separation unit. Ideally, there is a head space above the spray nozzles, since the unit is typically operated under vacuum. That way, if water, liquid organic products, and/or particulates are present in the headspace, they can be drawn into the vacuum system, which can be detrimental. The product separation unit further includes a vacuum line port at or near the top of the unit, preferably located in the headspace, so any products that remain in the gas phase after passing through the falling curtain can leave the unit for further processing. Thus, products that are gaseous at the relatively lower temperature, such as syngas, methane, and $C_{2-4}$ hydrocarbons, exit the product separation unit through an exit port (i.e., the vacuum line or port) at or near the top.

The remaining liquid and solid products are mixed with the water from the falling curtain. The oil products, which are insoluble in water, can be separated, for example, by decantation. Any solids present in the water can be filtered out, and the water reused in the falling curtain, optionally after being cooled before reuse.

FIG. 1 shows the results of thermal depolymerization, in terms of molecular weight distribution, shown by number of carbon atoms, using one embodiment of the apparatus described herein. The chart shows the results of five different runs, with random tires used in each run, and the results show that a reasonably constant product distribution was obtained.

As shown in FIG. 1, the liquid products tend to have a molecule weight distribution centered around $C_{10}$, and therefore largely falls within the diesel fuel range, though they can have relatively lower cetane values than conventional diesel fuel. To produce electricity, it can be preferred to use a slow-turning diesel generator rather than a conventional diesel fuel generator, as these generators are able to use lower cetane fuel sources.

Alternatively, distillation can be used to separate the product into different fractions. Ideally, a rapid distillation technique is used to convert the initial product stream into separate product streams. The initial product stream has a molecular weight average of around $C_{10}$, but also includes compounds in the $C_{5-9}$ range, which is a gasoline range, and products in the $C_{17-33}$ range, a portion of which ($C_{17-20}$) is in the diesel range, and a portion of which ($C_{21-33}$) is in the motor oil/lube base stock range.

As discussed elsewhere, the initial product stream has a relatively low cetane number, and may not work well as a stand-alone diesel fuel, though may be acceptable as a blend stock for diesel fuel. However, jet engines are not diesel engines, and jet fuel does not have a cetane requirement. Accordingly, where a fraction can be isolated in the $C_{9-15}$ range, it can be used as, or as a component in, one or more kerosene-type jet fuels, such as Jet A1, Jet B, and the like. Where a fraction can be isolated in the $C_{5-16}$ range, it can be used as a wide-cut jet fuel. Wide-cut jet fuel is typically a blend of kerosene and gasoline, often in a volume ratio of around 70/30. Where a fraction in the $C_{5-9}$ range can be isolated, it can be used as, or as a component in, gasoline. Once the initial product stream has been distilled to remove the lower molecular weight products (i.e., $C_5$-$C_{15-20}$), the remaining products (largely $C_{15-20}$-$C_{33}$) can be used for different uses, such as a component of or blend stock for motor oil or lube base oils.

The gaseous products, which may still include particles, can optionally be sent through a scrubber, such as venturi scrubber, an impingement filter and/or a cyclone separator, to remove particles from the gaseous products.

The gaseous products include syngas, and may also include methane, and $C_{2-4}$ hydrocarbons. These gaseous products, or a portion of them, can optionally used as fuel for a generator to provide electricity, or can simply be flared.

When the gaseous products are flared, they can pass through a detonation arrestor and a thermal oxidizer. The detonation arrestor ensures that any flame/explosion in the thermal oxidizer does not flow back into the system, and the thermal oxidizer ensures that any volatile organic compounds (such as syngas, methane, and/or $C_{2-4}$ hydrocarbons) are combusted, primarily forming carbon dioxide and water, so the gases are safe to emit to the environment.

Neither the detonation arrestor nor the thermal oxidizer remove sulfur from the resulting effluent gas stream, though sulfur-containing compounds may be converted to $SO_x$ compounds, which may not be desirable in flue gas/emissions streams. Accordingly, a desulfurization unit can optionally be present at a position after the particles are removed, such as after they pass through the thermal oxidizer).

The gas products can be isolated, or, if desired, combusted. If they are to be combusted, the apparatus can include a burner or generator after the vacuum pump or aspiration unit. The burner can be used to generate heat as the gas is burned, and the generator can be used to generate electricity as the gas is burned.

When the gaseous products are converted to electricity, they can be used as fuel for a generator, such as a stirling motor or an internal combustion motor. In stirling motors, the gaseous products are combusted externally, which in turn heats the stirling motor through a heat exchanger. The gas in the stirling motor expands, which moves the mechanism of the engine. The resulting work is used to generate electricity. Internal combustion engines, including motors with compression ignition (i.e., dual fuel low rpm reciprocating) can operate using the gaseous product stream as a secondary feedstock. This technology is commonly used for relatively small generator sets (i.e., in the range of around 0.5 and around 10 kW). Gas turbines can also be used, particularly in those embodiments where gas streams from multiple units are combined.

The thermal depolymerization is typically carried out under a vacuum, for example at pressures ranging from about −0.8 to about −200 millibars, more typically from about −0.8 to about −50 millibars. In order to achieve this vacuum, a vacuum pump or aspiration unit is attached at or near the end of the product separation unit. In one embodiment, the pressure can be increased up to about 8 millibars, particularly as gaseous products are evolved during the depolymerization process. These pressures can be reached, even when a vacuum is pulled, by off-gassing of various products. Control of the release of these products from the retort can help control the pressure.

The present invention be better understood with reference to the following detailed description.

DETAILED DESCRIPTION

Figure 1:
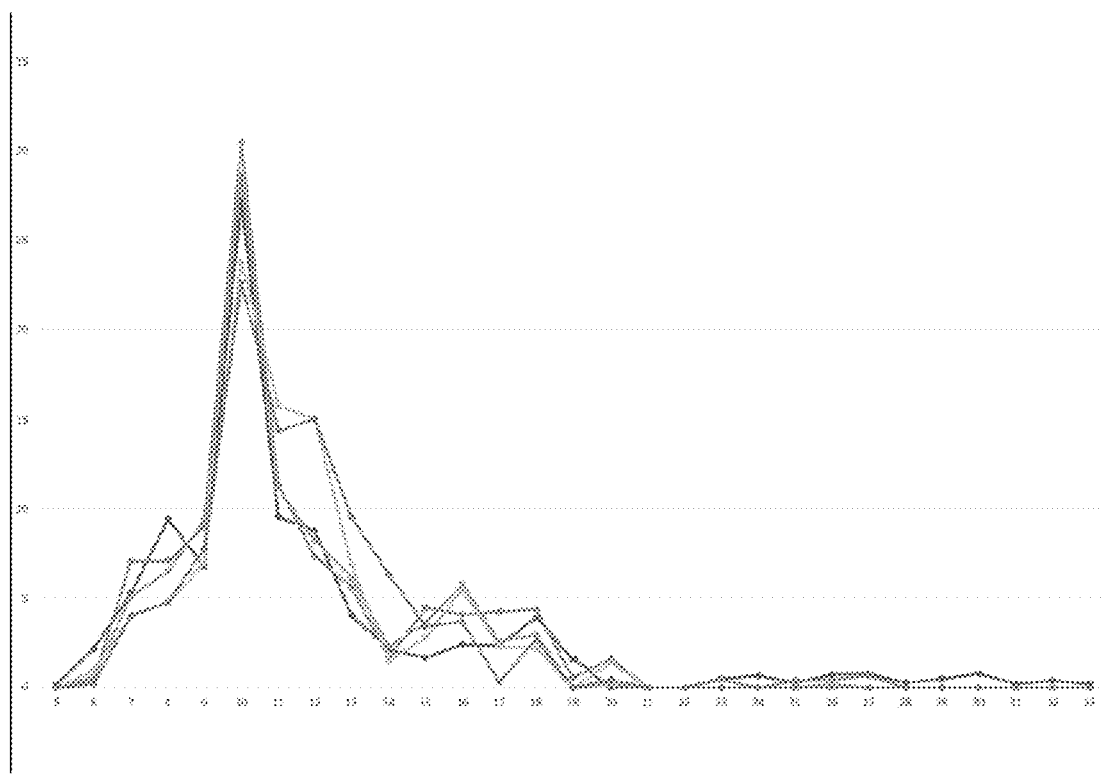
FIG. 1 is a chart showing the composition of an oil prepared by the thermal depolymerization process described herein.

In one embodiment, the invention relates to an apparatus for thermally de-manufacturing used tires, waste material from tire manufacture, and other post-consumer and post-industrial waste.

Definitions

As used herein, the term "retort chamber" refers to an airtight vessel in which substances are heated for a chemical reaction, producing gaseous products that may be collected in a collection vessel or used for further processing.

The term "thermally de-manufacturing" as used herein refers to the thermal depolymerization of polymeric materials, and also to the de-manufacturing of non-polymeric components. By way of example, where a tire is thermally de-manufactured, it is possible to isolate organic materials produced as a result of the depolymerization process, and also inorganic materials, such as steel from steel belts, and sulfur used in the vulcanization process, where the sulfur can be isolated in the form of sulfur-containing compounds. Where inorganic fillers are used in filled polymeric articles of manufacture, the fillers can be isolated separately from the thermally depolymerized articles of manufacture.

I. The Retort Chamber

The apparatus comprises a retort chamber (also referred to herein as a retort), which, preferably, is oriented in the vertical direction (or not horizontal-off the horizontal plane).

Shape of the Retort Chamber

The retort chamber can be of any desired shape, for example, a cylindrical or conical shape.

As discussed in more detail below, combustion or partial combustion of materials at or near the bottom of the retort chamber provides the heat energy for carrying out thermal depolymerization at a position higher up in the retort chamber. When the retort is substantially vertical, it allows for material to flow downward as combustion or partial combustion takes place.

Diameter of the Retort Chamber

The diameter of the retort chamber is important for carrying out the chemistry described herein. The diameter is typically between about 1.5 and about 24 feet, more typically between about 4 and about 8 feet. The height of the retort chamber is typically between about 5 and 30 feet. The side walls of the retort chamber are optionally insulated to help maintain the operating temperature.

While not wishing to be bound by a particular theory, it is believed that when the diameter is within the ranges provided above, the heat from the combustion of tires and/or other materials can flow through the retort chamber and heat other tires/other materials, such that they have sufficient heat energy to undergo thermal depolymerization.

Temperature Zones within the Retort Chamber

The inside of the retort chamber includes four different temperature zones, the locations of which can vary depending on a variety of factors, such as the oxygen and water content in the retort chamber, the reaction temperature and pressure, and the type of material being de-manufactured.

In the first zone, which is at or near the bottom of the retort chamber, material is heated to a temperature between about 900° C. and about 1300° C. and combusted or partially combusted. One or more of oxygen, water, and/or a catalyst can optionally be provided through a valve at or near the bottom of the retort chamber. Oxygen can be provided, for example, in pure form or as air.

A depolymerization zone overlies the first zone, and the chemistry occurs at a temperature between about 150 and about 550° C., for example, between about 150 and 400° C. or between about 250 and about 550° C.

Products leave the retort chamber at a zone higher than the depolymerization zone, and the temperature at which the products leave the retort chamber is typically between about 100 and 280° C.

Although it is possible to monitor the temperature within the actual depolymerization zone, it can be operationally easier to monitor the progress of the reaction by monitoring the temperature of the product mixture as it leaves the retort chamber through one or more outlet ports.

Near the top of the retort chamber, far from the intense heat provided at the bottom of the retort chamber, the temperature is typically in the range of about 60 to about 160° C.

The Bottom of the Retort Chamber

Heat can be provided to the first zone, for example, by introducing a burner through an opening in the wall of the retort chamber, at or near the bottom of the retort chamber. The heat produced by the combusting/partially-combusting the material is then used to reach a desired depolymerization temperature. Alternatively, the heat energy can be provided by providing the bottom of the retort chamber with a layer of refractory material, and heating the refractory material to a desired temperature using any of a variety of different heaters, such as induction heaters.

In one embodiment, the bottom of the retort chamber includes a series of registers, where the oxygen, air, water, and/or catalyst is introduced at one end of the series of registers, and flame from a burner is introduced at the other end of the series of registers. The burner can be placed on a carriage, which facilitates its movement through the retort. The registers are spaced so as to provide substantially equal pressure along the entire bottom of the retort. By "substantially equal" is meant that the pressure along the bottom of the retort chamber does not vary by more than 20%.

In operation, as the burner is moved along the carriage toward the center of the bottom of the retort chamber, the chemical reaction, namely, burning the tires and/or other materials, is moved toward the center. This provides a relatively constant rate of combustion to the materials being combusted, in contrast with merely introducing the burner to one end of the register.

Inlet/Outlet Ports

In the first embodiment a number of ports are provided to permit the input of one or more oxygen, air, water, and/or catalysts, and the output of products, and to measure and manage rate of flow, temperature, and pressure.

In the second embodiment a number of input and output ports are used to create multiple zones for the refinement of solid, liquid and vapor creating multiple products.

Inlet ports can be located at or near the bottom of the retort, so that oxygen/air can be provided, and water/steam can be provided. Water can also be provided through an inlet port at or near the top of the retort.

A valve is attached to each inlet port so as to control the amount of material that is input into the retort.

One or more outlet ports are located above the depolymerization zone, so that gaseous products can leave the retort and then be collected.

Vacuum Line or Port (Connected Indirectly to a Pump/Aspiration Unit)

The thermal depolymerization is carried out under a vacuum, which is typically on the order of between about −0.8 to about −200 millibar, more typically between about −3 to about −10 millibar. In some embodiments, the pressure can increase to up to around 8 millibar, particularly as gaseous products are produced.

In order to achieve this vacuum, a vacuum line or port is positioned between about 40 and about 60% of the distance between the bottom and the top of the retort chamber, more typically between about 40 and about 55% of the distance, and the vacuum line is connected, indirectly, to a vacuum pump or aspiration unit attached to a device used to isolate and/or separate the products.

For example, where the retort chamber is attached to a product separation unit, which includes a chamber, the vacuum line can be attached at or near the bottom of the chamber. The chamber can either be connected directly to a vacuum pump or aspiration unit, or can be connected, via one or more lines, to one or more additional components, and the vacuum pump or aspiration unit can be attached to one or more of these additional components. In one embodiment, the vacuum pump or aspiration unit is attached to a component at or near the end of the product separation unit.

The gas products can be isolated, or, if desired, combusted. If they are to be combusted, the apparatus can include a burner (flare) or generator after the vacuum pump or aspiration unit. The burner can be used to generate heat as the gas is burned, and the generator can be used to generate electricity as the gas is burned.

Cooling the Retort Chamber

It can be desirable, between batches, to cool down the retort. In operation, water is typically added to the retort from a valve, attached to an inlet port, at or near the bottom of the retort. During cooling operations, water can also be or alternatively be added from a valve, attached to an inlet port, at or near the top of the retort. This can significantly accelerate the cool-down process, which allows the next batch to be processed faster than if water is not added from the top of the retort chamber.

Temperature Monitoring

There are a variety of ways to monitor temperature inside a reactor, such as the inside of a retort chamber. Examples include temperature gauges, thermocouples, thermometers, and/or thermostats. Thermometers can be preferred in those zones where the products of the thermal depolymerization leave the retort chamber (i.e., above the depolymerization zone), as the temperature typically ranges from about 100 to about 280° C., and these are temperatures which can be measured using a thermometer. However, near the bottom of the retort chamber, where temperatures exceed about 900° C., and in the depolymerization zone itself, where temperatures are between 250 and 550° C., a thermocouple may be a preferred way to measure the temperature.

Top of the Retort Chamber

The top of the retort can be opened to load tires and/or other materials to be thermally de-manufactured into the retort. This can be accomplished by attaching the top to the remainder of the retort using a clam-shell hood, a hinge, a screw top, a series of flanges, and the like. However, in one embodiment, the top is a free-floating top, which can be lifted straight up and out of the retort chamber, allowing access to the chamber to load tires or other materials to be depolymerized.

The top of the retort chamber can be equipped with one or more inlet ports, and valves attached to the ports, to allow water to flow into the retort. Alternatively, the inlet port(s) and valve(s) can be positioned below the actual top of the retort chamber, but in the upper third of the retort, so that the valves/ports do not have to be detached when the top is opened, non-combusted materials are removed, and the next batch of materials to be depolymerized is added.

Removal of Solid Material from the Retort

Between batches, it is desirable to remove the leftover solid material from the retort. In the case of tires, leftover material can include carbon black and steel from the steel belts in the tires. There are several ways to remove leftover material from the retort. One exemplary way is to provide a hinge on the bottom of the retort, and unhinge the bottom after the material has been thermally depolymerized, thereby removing the material from the retort.

Another way is to provide a hinge with a horizontal axis around the middle of the retort, and a motor for rotating the retort. After the top is removed, the retort can be rotated around the horizontal axis of the hinge. Materials collected at the bottom of the retort then drop out of the top of the retort. The retort can then be rotated back to the vertical position, and any pipes, valves, or other connections which were disconnected in order to rotate the retort can be reconnected.

II. The Product Separation/Cooling Unit

Those of skill in the art of oil refining know how to use cyclonic separation, as similar separators are used in the oil refining industry to separate catalyst particles from gaseous product mixtures.

While the products exiting the retort are in the gas phase, at room temperature, some products are liquid, and others are gaseous. The apparatus further includes a product separation unit, which includes one or more heat exchangers, cooling towers, distillation towers, chillers, curtains of liquid through which gaseous streams can pass, and the like, to cool down the gas and separate the product mixture into one or more liquid and one or more gaseous products.

In a preferred embodiment, the product separation unit uses a falling curtain of water (and/or oil) drops or droplets to cool the gas shortly after it leaves the retort chamber through the vacuum line or port.

The gaseous product, as it is cooled to a relatively lower temperature than when it left the retort chamber, separates into a product stream that remains gaseous, and a liquid product stream, as well as particulates that may be found in either of these streams. The liquid product stream is mixed with some solids and the water from the falling curtain, and this mixture is collected, for example, in a tank. The organic product stream can be isolated, for example, by decantation, and the particulates, such as carbon black, can be isolated, for example, by filtration.

Particulates remaining in the gaseous phase can be removed, for example, by passing the gas stream through one or more of a venturi scrubber, an impingement filter, and a cyclone separator. A vacuum pump or aspiration unit is present somewhere along the path, typically after some or all of the particles have been removed.

The remaining gas stream includes syngas, methane, and/or $C_{2-4}$ hydrocarbons, and likely also includes sulfur. An optional desulfurization unit can be present at some point along the product isolation unit to remove sulfur, but its location, if present, will depend on how the gas stream is used. If the gas is simply to be flared, or as an energy source for electricity generation, sulfur can be removed after the gas is burned, and before it leaves the flue and enters the environment. If syngas is to be used to generate other products, such as hydrogen, methanol, low molecular weight olefins, or paraffin wax, then it may be preferred to remove sulfur before the gas mixture contacts sulfur-sensitive catalysts, such as the iron catalysts used to produce olefins or the cobalt catalysts used to produce paraffin wax. Other catalysts are less sensitive to sulfur, so the sulfur can be removed either before or after the syngas contacts the catalysts.

Syngas includes a mixture of carbon monoxide and hydrogen. The carbon monoxide can be converted to carbon dioxide and additional hydrogen using the well-known water-gas shift reaction. In this reaction, steam is reacted with the carbon monoxide under pressure, and in the presence of certain catalysts, to form carbon dioxide and hydrogen. Carbon dioxide is liquid under pressure, so can be separated from the hydrogen gas.

Syngas can be converted to methanol, for example, using any of the relatively well-known catalysts and conditions for methanol synthesis. Representative catalysts and conditions are described, for example, in U.S. Pat. No. 1,569,775, where the catalyst is a chromium and manganese oxide catalyst, and the pressures ranging from 50 to 220 atm, at temperatures up to 450° C. Modern methanol production is more efficient, using catalysts (commonly copper) capable of operating at lower pressures. The modern low pressure methanol (LPM) process was developed by ICI in the late 1960s with the technology now owned by Johnson Matthey.

Today, the most widely used catalyst for converting syngas to methanol is a mixture of copper, zinc oxide, and alumina first used by ICI in 1966. At 5-10 MPa (50-100 atm) and 250° C., it can catalyze the production of methanol from carbon monoxide and hydrogen with high selectivity.

Additional representative catalysts and conditions are described, for example, in Vanden Bussche and Froment, 1996 "A steady-state kinetic model for methanol synthesis and the water gas shift reaction on a commercial Cu/ZnO/Al$_2$O$_3$ catalyst," Journal of Catalysis, 161, pp. 1-10.

Syngas can be converted to olefins or paraffin wax, for example, using Fischer-Tropsch Synthesis conditions and iron catalysts. The use of Fischer-Tropsch synthesis to form relatively low molecular weight olefins is well known. A brief discussion of Fischer-Tropsch synthesis is provided below.

Fischer-Tropsch chemistry tends to provide a wide range of products, from methane and other light hydrocarbons, to heavy wax. Syntroleum (a term used to define hydrocarbons in the diesel range formed by Fischer-Tropsch synthesis) is typically formed from the wax/heavy fraction obtained during Fischer-Tropsch Synthesis using a cobalt catalyst, or other catalyst with high chain growth probabilities, followed by hydrocracking of the wax. Low molecular weight olefins are typically obtained from the light gas/naphtha heavy fraction obtained via Fischer-Tropsch chemistry using iron catalysts, or other catalysts with low chain growth probabilities.

Olefins formed using iron catalysts are predominantly in the $C_{2-4}$ range, predominantly propylene. These iron catalysts are known as "catalysts with low chain growth probabilities." Fischer-Tropsch wax can be produced using cobalt catalysts, which are known as "catalysts with high chain growth probabilities."

In general, Fischer-Tropsch catalysts contain a Group VIII transition metal on a metal oxide support. The catalyst may also contain a noble metal promoter(s) and/or crystalline molecular sieves. Pragmatically, the two transition metals that are most commonly used in commercial Fischer-Tropsch processes are cobalt or iron. Ruthenium is also an effective Fischer-Tropsch catalyst but is more expensive than cobalt or iron. Where a noble metal is used, platinum and palladium are generally preferred. Suitable metal oxide supports or matrices which can be used include alumina, titania, silica, magnesium oxide, silica-alumina, and the like, and mixtures thereof.

Although Fischer-Tropsch processes produce a hydrocarbon product having a wide range of molecular sizes, the selectivity of the process toward a given molecular size range as the primary product can be controlled to some extent by the particular catalyst used. When forming syntroleum, it is preferred to produce $C_{20-50}$ paraffins as the primary product, and therefore, it is preferred to use a cobalt catalyst, although iron catalysts may also be used.

The Fischer-Tropsch reaction is typically conducted at temperatures between about 300° F. and 700° F. (149° C. to 371° C.), preferably, between about 400° F. and 550° F. (204° C. to 228° C.). The pressures are typically between about 10 and 500 psia (0.7 to 34 bars), preferably between about 30 and 300 psia (2 to 21 bars). The catalyst space velocities are typically between about from 100 and 10,000 cc/g/hr., preferably between about 300 and 3,000 cc/g/hr.

The reaction can be conducted in a variety of reactors for example, fixed bed reactors containing one or more catalyst beds, slurry reactors, fluidized bed reactors, or a combination of different type reactors. Fischer-Tropsch processes which employ particulate fluidized beds in slurry bubble column reactors are described in, for example, U.S. Pat. Nos. 5,348,982; 5,157,054; 5,252,613; 5,866,621; 5,811,468; and 5,382,748, the contents of which are hereby incorporated by reference.

Low molecular weight fractions can be obtained using conditions in which chain growth probabilities are relatively low to moderate, and the product of the reaction includes a relatively high proportion of low molecular weight ($C_{2-8}$) olefins and a relatively low proportion of high molecular weight ($C_{30+}$) waxes. In contrast, high molecular weight fractions can be obtained using conditions in which chain growth probabilities are relatively high.

The pressure, recirculation of residual gas, reaction temperature, and synthesis gas space velocity all have an effect on the product yield and distribution. Ideally, the temperature and other factors are adjusted to maintain a constant carbon monoxide conversion of greater than about 85%, ideally, greater than about 95 percent. The exact values for these factors will be expected to vary depending on the nature of the reactor, that is, the reactor size, cooling conditions, type of catalyst, and the like. Those of skill in the art will readily understand how to optimize the reaction conditions to achieve a desired product distribution.

The same Fischer-Tropsch catalysts can be used in fixed and fluidized beds. The synthesis gas used can be of a similar composition to that use in a fixed-bed, however, to minimize wax and carbon formation, the $H_2$:CO ratio can be increased (i.e., to around 2.35:1). It may be desirable to use relatively high recycle ratios in order to maintain the catalyst in a fluid condition without using excessively high synthesis-gas rates.

When iron catalysts are used in the synthesis at 10 or 20 atmospheres pressure, appreciable amounts of alcohols can be produced. Thus, when a synthetic ammonia iron catalyst is used at relatively low temperatures (190 to 220° C.) and with a high gas velocity (Holroyd, R., "I. G. Farbenindustrie A. G., Leuna," C.I.O.S. Report File No. XXXII, 107 and Reichl, E. H. (U.S. Naval Technical Mission in Europe), "The synthesis of Hydrocarbons and Chemicals from CO and Hydrocarbon: B.I.O.S. Miscellaneous Report No. 60, the contents of each of which are hereby incorporated by reference), straight chain primary alcohols constitute 60 percent of the liquid products.

Uses for the Liquid Product Stream

In some embodiments, the liquid product stream has a boiling point distribution similar to number 2 diesel, though it has a relatively lower cetane number. In some embodiments, it is used as fuel to generate electricity, typically in a slow-turning diesel generator rather than a conventional diesel fuel generator. Slow-turning diesel generators tend to be extremely fuel efficient, can tolerate diesel fuel with a relatively low cetane number, and can be used for standby or continuous use.

In other embodiments, the liquid product stream can be further processed into higher value products. For example, as shown in FIG. 1, the liquid products have a molecule weight distribution centered around $C_{10}$, and therefore fall within the diesel fuel range. However, the cetane values for the products tend to be relatively lower than conventional diesel fuel, for example, in some embodiments, running in the 32-35 range. Diesel fuel typically has a cetane value of around 42-45, with a minimum cetane number of 40 where ASTM D975 is the diesel fuel standard, and premium diesel fuel can have a cetane number as high as 60. The product can be used as a blend stock with diesel fuel, where the amount of the product is not sufficient to lower the cetane value of the blended product outside of an acceptable range.

Alternatively, distillation can be used to separate the product into different fractions. Ideally, a rapid distillation technique, such as flash distillation, "one theoretical plate" distillation, or distillation using, for example, using a wiped film evaporator, is used provide two products streams, one with a relatively low average molecular weight, and one with a relatively high average molecular weight. Accordingly, in one embodiment, the product separation apparatus is connected to, or is adjacent to, a rapid distillation apparatus, such as a wiped film evaporator.

When the product stream resulting from the thermal depolymerization of tires has a molecular weight average of around $C_{10}$, the relatively low molecular weight fraction typically has a molecular weight distribution centered around $C_{5-9}$. This product stream can be used, for example, as blend stock for gasoline, and the remaining fraction in the $C_{10-16}$ range can be used, for example, as a blend stock for various jet fuels. For example, the ASTM specification for Jet-A, ASTM D1655, has no minimum cetane rating, because cetane pertains to compression ignition engines, and has no meaning in turbine engines.

The starting product mixture includes compounds in the $C_{17}$-$C_{33}$ range. Products in the $C_{17-20}$ range can be used as components of diesel fuel, but if jet fuel or a blend stock for use in jet fuel is the desired product, it can be desirable to remove all compounds in the $C_{17-33}$ range. This can be accomplished using flash distillation. Once the low molecular weight end of the product stream is removed, the relatively higher boiling fraction has an average molecular weight above $C_{17}$ or $C_{20}$, and can be used, for example, as a component of or blend stock for motor oil or lube base oils, which tend to be in the $C_{14-40}$ range. The cetane number is similarly irrelevant for motor oil or lube base oils.

In some embodiments, efforts are taken to collect as much of the product stream as possible which is liquid at room temperature and atmospheric pressure, and in other embodiments, efforts are taken to separate one or more liquid products from each other.

In some embodiments, efforts are taken to collect as much of the products as possible which are gaseous at room temperature and atmospheric pressure in a single product stream, and in other embodiments, efforts are taken to separate one or more gas products from each other.

Generally, hydrocarbon products with five or more carbons in their chains (i.e., $C_{5+}$ hydrocarbons) are liquid at room temperature. Gas products typically include one or more of carbon monoxide, carbon dioxide, hydrogen gas, hydrogen sulfide, sulfur dioxide, methane, ethane, ethylene, propane, propylene, butane, and butylenes. Those hydrocarbon products with from two to four carbons in their chains (i.e., $C_{2-4}$ hydrocarbons) can be separated from other gas products, for example, using a de-methanizer column. Those products with from three to four carbons can be separated from those products with two carbons, for example, using a de-ethanizer column. Alternatively, the gaseous products, which tend to have a relatively high BTU value, can be burned and used to generate heat energy or electricity, as desired.

In some embodiments, rather than using the water curtain to cool the gaseous product stream, the gaseous product stream can initially pass through one or more heat exchangers, such as a condenser, to lower the temperature of the gas stream, and obtain a first liquid product stream and a second gas stream, which is made up of the components that did not liquefy in the first cooling step.

This liquid product stream can be pumped to a location downstream from where the gas is initially cooled, and used to create a curtain of cooled liquid, which can then be contacted with the second gas stream. This will cool the second gas stream, and provide a second liquid product stream which includes the initially-collected liquids, and those liquids obtained by cooling the second gas stream. This process can be repeated as desired.

Generally, the first products separated from the gaseous product stream are those with the largest molecular weights, and the last products separated from the gaseous products stream are those with the smallest molecular weights.

The amounts of liquid products and gaseous products will vary depending on the nature of the feedstock and the reaction conditions. However, the total liquid product content (i.e., the "oil content" in tire rubber that is thermally depolymerized using the apparatus and techniques described herein typically ranges from about 31 to about 41% by weight of the tires. The methane content is typically around 25%.

A representative product distribution is shown in FIG. 1. There is a significant product fraction with between about 6 and 9 carbons (i.e., a $C_{6-9}$ fraction), a significant fraction with between 14 and 17 carbons (i.e., a $C_{14-17}$ fraction), and a modest fraction above $C_{24}$. In this particular product distribution, on information and belief, the polymers in the tires being depolymerized were formed from monomers with these chain lengths, which would explain why there is little material with sizes in the $C_{10-13}$ range. Products lighter than $C_5$ are present in the gas phase, and were not subject to being analyzed. If operated at different temperatures and pressures, for example, at higher temperatures and/or pressures, than those used to create this particular product stream, the olefins in this initial product stream can further react to form olefin dimers/trimers/oligomers, can participate in Diels-Alder reactions with butadiene or other dienes to form cycloaliphatics, can become hydrogenated to form aliphatics, can undergo aromatization reactions to form aromatics, and the like.

As the boiling points of a $C_{6-9}$ fraction, a $C_{14-17}$ fraction, and a $C_{24+}$ fraction are so dissimilar, it is within the skill of those in the art to cool the product mixture and separate these types of fractions.

In order to manage the costs, it can be advantageous to use heat exchangers and curtains of liquid product as at least part of the product isolation unit.

The various components of the product isolation unit are discussed in more detail below:

Impingement Filters

An impingement filter can be used to remove particles from the liquid and/or gaseous products. The impingement filter acts by inducing the solution to change direction and the particles to adhere to the filter medium. In many cases, this filter medium is designed to contain apertures of specific size which will absorb the impurities in the solution. Examples of impingement filters include air filters, fuel filters and oil filters, which can be scaled appropriately for use in the processes described herein.

Wet Scrubbers

A wet scrubber, such as a venturi scrubber, can also be used. A venturi scrubber is designed to effectively use the energy from a high-velocity inlet gas stream to atomize the liquid being used to scrub the gas stream. This type of technology is a part of the group of air pollution controls collectively referred to as wet scrubbers.

Venturi scrubbers typically include an entrainment separator because the high velocity of gas through the scrubber will have a tendency to entrain the droplets with the outlet clean gas stream. Representative separators include cyclonic, mesh-pad, and blade separators, each of which can be used to remove liquid droplets from the flue gas and return the liquid to the scrubber water.

Ejector venturi scrubbers can also be used. An ejector venturi scrubber switches the source of the mixing energy from the gas stream to the scrubbing liquid. In this setup the liquid may be sprayed at a high enough velocity and volume to draw the process gas through the device without external assistance.

Particle Collection

The atomized liquid provides an enormous number of tiny droplets for the dust particles to impact on. These liquid droplets incorporating the particles must be removed from the scrubber outlet stream, generally by cyclonic separators.

Particle removal efficiency increases with increasing pressure drop because of increased turbulence due to high gas velocity in the throat. Venturis can be operated with pressure drops ranging from 12 millibar to 250 millibar.

Most venturis normally operate with pressure drops in the range of 50 to 150 cm (20 to 60 in) of water. At these pressure drops, the gas velocity in the throat section is usually between 30 and 120 m/s (100 to 400 ft/s), or approximately 270 mph at the high end. These high pressure drops result in high operating costs.

The liquid-injection rate, or liquid-to-gas ratio (L/G), also affects particle collection. The proper amount of liquid must be injected to provide adequate liquid coverage over the throat area and make up for any evaporation losses. If there is insufficient liquid, then there will not be enough liquid targets to provide the required capture efficiency.

Venturis can be used to collect both particulate and gaseous pollutants, but although the liquid surface area provided is quite large, they are more effective in removing particles since particles can be trapped by contact, whereas gases must be trapped by absorption during the relatively short exposure time.

A venturi scrubber consists of three sections: a converging section, a throat section, and a diverging section. The inlet gas stream enters the converging section and, as the area decreases, gas velocity increases. Liquid is introduced either at the throat or at the entrance to the converging section. The inlet gas, forced to move at extremely high velocities in the small throat section, turbulently mixes with the liquid, producing an enormous number of very tiny droplets. Particle and gas removal occur in the diverging section as the inlet gas stream mixes with the fog of tiny liquid droplets. The inlet stream then exits through the diverging section, where it is forced to slow down.

If liquid is introduced above the converging section and coats the walls up to the throat, then the venturi is described as having a "wet wall" or "wetted throat." This method allows particulates in the stream that may be prone to caking onto surfaces to be washed away and reduces the mechanical abrasion of particles hitting the throat at high speed. It very effective for handling hot, dry inlet gases that contain dust or particles, such as the carbon black found in tires.

Wetting of the throat can be achieved with a spray directed at the walls or with a weir encircling the converging section which water flows over. This method can be used only at liquid injection source, as the high velocity gas will shear droplets from the walls. Liquid can also be introduced by spray nozzles directly into the gas stream and for low gas flow velocities this may provide more efficient operation, either or both methods may be employed depending on the application.

Simple venturis have fixed throat areas, so will only operate efficiently over a certain range of flow rates. Adjustable-throat venturis allow efficiency to be maintained over a much larger range of flows by changing the size of the throat in accordance with the gas flow rate. Certain types of orifices (throat areas) that create more turbulence than a true venturi can be equally efficient for a given unit of energy consumed and the results of these findings led to the development of the annular-orifice, or adjustable-throat, venturi scrubber. The size of the throat area can be varied by moving a plunger, or adjustable disk, up or down in the throat, thereby decreasing or increasing the annular opening. Gas flows through the annular opening and atomizes liquid that is sprayed onto the plunger or swirled in from the top.

Wetted-throat venturis with round throats can handle inlet flows as large as 88,000 $m^3$/h (40,000 cfm). Additional weirs and/or baffles can be used to accommodate inlet flow rates greater than this. The rectangular-throat venturi is often built to be adjustable by introducing moving plates or flaps into the throat. A water-wash spray can be used to continually wash collected material from the plate.

Non-Wetted Throat Venturi Scrubber

Another modification can be seen in the venturi-rod or rod deck scrubber. By placing a number of pipes parallel to each other, a series of longitudinal venturi openings can be created. The area between adjacent rods is a small venturi throat. Water sprays help prevent solids buildup. The principal atomization of the liquid occurs at the rods, where the high-velocity gas moving through spacings creates the small droplets necessary for fine particle collection. This method can produce very high water droplet densities in the gas stream due to a very high throat perimeter compared to other types. These rods must be made of abrasion-resistant material due to the high velocities present.

Detonation Flame Arrestors (Detonation Arrestors)

Detonation flame arresters are devices fitted to the opening of an enclosure, or to the connecting pipe work of a system of enclosures, to assist with arresting detonations. Their intended function is to allow flow, but prevent the transmission of flame propagating at supersonic velocity.

Detonation flame arresters were developed to control evaporative hydrocarbon emissions from loading and storage operations, in a process known as vapor control. Two types of recognized vapor control technologies are commonly used; carbon adsorption vapor recovery and vapor destruction or combustion. Vapor destruction systems include elevated flare systems, enclosed flare systems, burner and catalytic incineration systems, and waste gas boilers. Both systems require flame or detonation flame arresters to maximize safety.

Flame arresters are passive devices with no moving parts. They prevent the propagation of flame from the exposed side of the unit to the protected side using a metal matrix to create a tortuous path, called a flame cell or element, for the gas to travel through. All detonation flame arresters operate on the same principle: removing heat from a flame as it attempts to travel through narrow passages with walls of metal or other heat-conductive material. Unlike flame arresters, detonation flame arresters must withstand extreme pressures that travel at supersonic velocities.

Detonation flame arresters typically include layers of metal ribbons with crimped corrugations. The internal narrow passages of the crimped corrugations make up the element matrix. These passages are measured as the hydraulic diameter, and are made smaller for gases having smaller maximum experimental safe gaps (MESG).

Under normal operating conditions, a flame arrester permits a relatively free flow of gas or vapor through the piping system. If the mixture is ignited and the flame begins to travel back through the piping, the arrester will prohibit the flame from moving back to the gas source.

After leaving the detonation arrestor, the (flammable) gases can be used in chemical syntheses, flared, or combusted in a generator to produce electricity. When flared or combusted to produce electricity, after being ignited, the resulting flame might otherwise travel inside the system, which could otherwise result in catastrophic damage.

Thermal Oxidizers

A thermal oxidizer (also known as a thermal incinerator) is a process unit for air pollution control in many chemical plants that decomposes hazardous gases at a high temperature and releases them into the atmosphere, typically as a mixture including water and carbon dioxide.

Thermal oxidizers are typically used to destroy volatile organic compounds (VOCs) as they leave the system. When destroyed via thermal combustion, they are chemically oxidized to form carbon dioxide and water. Three main factors in designing the effective thermal oxidizers are temperature, residence time, and turbulence. The temperature needs to be high enough to ignite the waste gas. Most organic compounds ignite at the temperature between 590° C. (1,094° F.) and 650° C. (1,202° F.). To ensure near destruction of hazardous gases, most basic oxidizers are operated at much higher temperature levels. When catalyst is used, the operating temperature range may be lower. Residence time is to ensure that there is enough time for the combustion reaction to occur. The turbulence factor is the mixture of combustion air with the hazardous gases. Representative thermal oxidizers include direct-fired thermal oxidizers and regenerative thermal oxidizers (RTOs).

In a direct-fired thermal oxidizer, a process stream with flammable gases is introduced into a firing box through or near a burner, and enough residence time is provided to get the desired destruction removal efficiency (DRE) of volatile organic compounds (VOCs) in the process stream. Most direct-fired thermal oxidizers operate at temperature levels between 980° C. (1,800° F.) and 1,200° C. (2,190° F.) with air flow rates of 0.24 to 24 standard cubic meters per second.

Regenerative thermal oxidizer, commonly referred to as a RTO. RTOs use a ceramic bed which is heated from a previous oxidation cycle to preheat the input gases to partially oxidize them. The preheated gases enter a combustion chamber that is heated by an external fuel source to reach the target oxidation temperature which is in the range between 760° C. (1,400° F.) and 820° C. (1,510° F.).

Ventilation air methane thermal oxidizers, thermal recuperative oxidizers, flameless thermal oxidizers, recuperative catalytic oxidizers, and regenerative catalytic oxidizers can also be used.

Desulfurization Unit

Desulfurization is a chemical process for removing sulfur from a material, such as the product stream from the thermal depolymerization process described herein. Desulfurization conditions for removing sulfur from a gas stream are known to those of skill in the art.

Representative conditions are described, for example, in U.S. Pat. No. 7,687,047. In that patent, sulfur-containing gases containing $H_2S$ and COS are contacted with a sorbent comprising a substitutional solid solution characterized by the formula $Mn_ZZn_{(1-Z)}Al_2O_4$. Other sorbent beds include alumina and/or zinc oxide.

Where the goal is the simultaneous removal of COS, $SO_2$ and $H_2S$, a desulfurization process typically involves contacting the gas stream, which includes one or more of these sulfur compounds with a sorbent in a sorption zone to produce a product gas stream and a sulfur laden sorbent. These sorbents typically include zinc (Zn), and can also include a promoter metal, such as manganese, as well as a support, such as alumina. The sorbent, once saturated with sulfur, can be regenerated by contacting at least a portion of the sulfur-laden sorbent with are generation gas stream, in a regeneration zone, to produce a regenerated sorbent and an off-gas stream. At least a portion of the regenerated sorbent can then be returned to the sorption zone. Where the regeneration of the sorbent produces $SO_2$, the gas can be contained in an appropriate storage tank, or reduced to form elemental sulfur.

In addition to or in place of removing sulfur, in one embodiment, a dehalogenation unit is used to remove chlorine or other halogens from the gas stream. Reductive dehalogenation using heterogeneous catalytic and electrolytic methods can dehalogenate chlorinated gas-phase contaminants while avoiding the generation of trace contaminants like dioxins because of the absence of oxygen. Due to the electronegative character of halogen substituents, heavily chlorinated aliphatics are thermodynamically disposed for reductive dehalogenation by electron donors such as elemental hydrogen (for example, reacting the gas with hydrogen in the presence of a platinum, palladium, or rhodium catalyst, optionally present on a carbon, alumina, zeolite, silica, titanium oxide, or zirconium oxide support media). Chlorines can also be reacted with transition metals to form covalent bonds.

As the product stream is formed, and exits the retort chamber, it is in the gas phase. When cooled, one or more products which are liquid at room temperature and atmospheric pressure and one or more products which are gases at room temperature and atmospheric pressure can be separately isolated.

In some embodiments, sulfur is removed from liquid products isolated from the gaseous product stream, either while they are in liquid form, or after they are combusted, before the combustion product stream, which includes carbon dioxide and water, leaves the apparatus and enters the environment. In other embodiments, sulfur is removed from gaseous products isolated from the gaseous product stream after it is cooled, or from the gaseous product stream before it is cooled.

It can be easier to remove sulfur from the gaseous product stream than from separate liquid and gas streams, and for this reason, it can be advantageous to include the desulfurization unit at a point where the gaseous products first leave the retort chamber, i.e., before they have been cooled and separated. Accordingly, in one embodiment, a desulfurization unit is attached to the vacuum line or port, so that the products can be subjected to desulfurization conditions.

In other embodiments, a desulfurization unit is present at a position in a product isolation unit rather than being attached to the retort chamber.

Cyclone Separator/Particulate Removal

In one embodiment, a cyclone separator is used to remove particulates present in the vapor. If a desulfurization unit is used, the cyclone separator can be attached before or after the desulfurization unit, though is preferably attached before the desulfurization unit to minimize particulate contamination of the desulfurization unit.

As used herein, cyclonic separation is a method form removing particulates from the gaseous product stream, without using filters, through vortex separation. A gas cyclone is used, and rotational effects and gravity are used to separate the solids from the gases. The method can also be used to separate fine droplets of liquid from a gaseous stream.

A high-speed rotating airflow is established within a cylindrical or conical container called a cyclone. Air flows in a helical pattern, beginning at the top (wide end) of the cyclone and ending at the bottom (narrow) end before exiting the cyclone in a straight stream through the center of the cyclone and out the top.

Relatively large and dense particles in the rotating stream have too much inertia to follow the tight curve of the stream. When they strike the outside wall, they fall to the bottom of the cyclone where they can be removed in a conical system, as the rotating flow moves towards the narrow end of the cyclone, the rotational radius of the stream is reduced, thus separating smaller and smaller particles. The cyclone geometry, together with flow rate, defines the cut point of the cyclone, i.e., the size of particle that will be removed from the stream with a 50% efficiency. Particles larger than the cut point will be removed with a greater efficiency, and smaller particles with a lower efficiency.

An alternative cyclone design uses a secondary air flow within the cyclone to keep the collected particles from striking the walls, to protect them from abrasion. The primary air flow containing the particulates enters from the bottom of the cyclone and is forced into spiral rotation by stationary spinner vanes. The secondary air flow enters from the top of the cyclone and moves downward toward the bottom, intercepting the particulate from the primary air. The secondary air flow also allows the collector to optionally be mounted horizontally, because it pushes the particulate toward the collection area, and does not rely solely on gravity to perform this function.

III. Materials that can be Thermally De-Manufactured

In one embodiment, tires are the material being thermally de-manufactured. The tires can come from the tire manufacturer (i.e., post-industrial waste), from a landfill (i.e., post-consumer waste), or both. In some aspects of this embodiment, tire scrap includes un-vulcanized rubber.

Where tires come from a tire manufacturer, the monomers resulting from thermal depolymerization can be returned to the manufacturer, as can the steel belts from steel-belted tires. Where the tires come from a landfill, the product mixtures can be used to generate one or more products with a higher value, and lower volume, than the tires. Where a desulfurization unit is used, the products will have a low sulfur content, and the amount of sulfur released into the environment will be significantly lower than if tires were merely burned.

In some embodiments, the tires are added to the retort chamber intact, and in other embodiments, the tires are cut into two or more pieces, and the pieces added to the retort chamber.

When tires are stacked inside the retort chamber, there is a significant amount of empty space that can be filled, for example, with other materials to be depolymerized. A reasonable amount of void volume should remain, so that the heat can be transferred from the bottom of the retort chamber to the depolymerization zone. Ideally, the amount of void space that can be filled is less than 75% by volume, more typically less than about 50% by volume, and still more typically, less than about 25% by volume.

In addition to, or in place of, tires, other materials that can be de-manufactured include un-vulcanized rubber, Banbury sludge, medical waste, wood-based waste, oil-based waste, plant matter, animal waste, human waste, fish waste, computer waste, printed circuit boards, "fluff" from the demolition of cars and asphalt extender.

The products resulting from the thermal de-manufacturing of these materials will vary from those obtained from tires, and the operating temperatures may be varied as well, depending on the appropriate temperatures at which the polymers undergo thermal depolymerization.

IV. Thermal De-Manufacturing Process

In the process described herein, the top of the retort chamber is opened, and tires and/or other materials to be thermally depolymerized are added. Typically, the tires are stacked on top of each other, from the bottom to the top of the retort. This way, as the tires near the bottom are combusted to provide heat energy for the depolymerization reaction, tires stacked above the tires that are combusted can fall down, thus providing fresh feedstock for combustion, and a continuous source of heat for the depolymerization reaction.

In some embodiments, the thermal depolymerization is carried out under vacuum, as the gases could explode if contacted with air at high temperatures, and, as thermal depolymerization follows the principles of Le Chatelier's Principle, namely, that to convert a polymer molecule to many monomer molecules, a vacuum is favored, whereas to convert many monomer molecules to a polymer molecule, pressure is favored. Typically, to ensure that the air and any volatile gases are removed, a nitrogen or carbon dioxide atmosphere is established, for example, through an inlet port, and then a vacuum is applied, using the vacuum pump or other means described herein for providing a vacuum. Gases and other volatiles which flow out of the retort can be captured under pressure, released to the atmosphere, or flared depending on process, cost and value.

The use of nitrogen, carbon dioxide, or other inert gases is optional, and establishing a vacuum is optional. Typically, the pressure at which the thermal depolymerization is carried out is between about −0.8 and about −200 millibars, more typically between about −3 and about −10 millibars. The system is completely sealed and little or no noxious or odor-based vapors are permitted to escape.

Once air and volatile gases are purged, and a vacuum can be established, heat is added to the bottom of the retort, heating the bottom row of tires and/or other material to be thermally de-manufactured to a temperature between about 900 and 1300° C. This can be done using any suitable means, such as by using an induction heater, heating refractory material, using burners, and the like.

One particularly efficient way of introducing this heat is to have a series of registers at or near the bottom of the retort chamber. A combustion agent, such as air or oxygen can be introduced at one end of the series of registers, and flame from a burner can be introduced at the other end of the series of registers. The burner can be placed on a carriage, which facilitates its movement through the retort. The registers can be spaced so as to provide substantially equal pressure along the entire bottom of the retort. By "substantially equal" is meant that the pressure along the bottom of the retort chamber does not vary by more than 20%.

Once the tires reach this temperature, they will combust, and produce heat. A steady stream of air or oxygen is maintained, added through an inlet port at or near the bottom of the reactor. Because the oxygen is present at a low concentration, and is consumed by the smoldering tires, this does not significantly increase the pressure.

Once the desired temperature is reached, heat will flow upward, and cause thermal depolymerization of the tires and/or other materials. The desired temperature range for thermal depolymerization of the rubber present in the tires is between around 100 and 280° C., though at the higher end of this temperature range, products with lower molecular weights tend to be formed, and at the lower end of this temperature range, products with higher molecular weights tend to be formed.

Water is also added, typically through in inlet port at or near the bottom of the reactor. The water allows one to have some control over the reaction temperature. While not wishing to be bound to a particular theory, it is also believed that when tires are thermally depolymerized, iron present in the steel belts reacts with carbon monoxide formed as a result of incomplete combustion (i.e., by using less than stoichiometric oxygen) and the water that is introduced to form hydrogen, in a manner analogous to that in the "steam-iron" process. The thus-formed hydrogen can break sulfur-sulfur and carbon-sulfur linkages present in the vulcanized rubber used in tires, and form hydrogen sulfide and other sulfur-containing products (including, but not limited to, COS).

The process described herein is unique, in that it allows one to have some degree of control over the product distribution. For example, if it is desired to produce methane as a major product, the depolymerization reaction can be run at a relatively higher temperature, and if it is desired to isolate more of the monomers, the depolymerization reaction can be run at a relatively lower temperature.

Regardless of the temperatures at which the bulk of the depolymerization takes place, the temperature will tend to rise when the reaction nears completion.

The temperature in the retort is monitored during the thermal depolymerization step. The temperature can be monitored at multiple locations within the retort chamber. For example, the combustion/smoldering of tires and/or other material at or near the bottom of the reactor can be monitored to ensure that the temperature stays in the range of 800–1300° C., more typically, 900-1300° C. The temperature in the depolymerization zone can be monitored to ensure that the temperature stays in the range of between about 150 and 550° C., more typically, between about 250-550° C. or between about 150 and 450° C., and/or the temperature of the products leaving the retort chamber can be monitored to ensure that the temperature stays in the range of between about 100 and about 280° C.

As the temperatures reach their appropriate ranges, gaseous products evolve from the port or ports. From there, the gaseous products can be subjected to a cyclone to remove particulates, a desulfurization step to remove hydrogen sulfide and other sulfur-containing products, and a cooling process to allow products that are liquid at room temperature to be separated from those which are gaseous at room temperature. The gaseous products can be collected and stored, burned, or used to generate electricity.

The cooling process can be adjusted as desired, to combine all of the gas and all of the liquid products, or to separately isolate one or more liquid fractions and/or one or more gas fractions.

As the reaction proceeds, tires and/or other materials at or near the bottom of the retort chamber are consumed, and, using gravity, materials from higher above the consumed materials then proceed down the retort chamber until they are depolymerized.

After the reaction is complete, which can be judged, for example, by changes in temperature in the various zones, the reaction can be quenched, for example, by introducing water through a valve at or near the top of the retort chamber.

When the retort chamber has sufficiently cooled, the water can be drained, and solid materials can be removed from the retort chamber.

In one embodiment, this involves opening a hinge at the bottom of the retort chamber to release the materials. In another embodiment, this involves removing the top, decoupling the outlet port, and rotating the retort around a hinge with a horizontal axis located at or near the middle of the retort. The materials then fall out of the top of the retort chamber, and the retort chamber can then be moved back to its original upright position.

Products of Thermal De-Manufacturing of Tires

The products obtained from thermally de-manufacturing tires tend to include carbon black, sulfur compounds, steel (from steel belts), a liquid, largely olefinic, fraction with properties similar to number 2 diesel, methane gas, a $C_{2-4}$ fraction, and one or more additional gases, such as carbon dioxide, carbon monoxide, sulfur dioxide and hydrogen. As discussed above, in some embodiments, the olefins in the olefinic fraction can further react to form dimers, trimers, and oligomers, cycloaliphatics, aliphatics, and/or aromatics. Removing the solid products from the retort chamber while they are still wet can facilitate the isolation of carbon black.

EXAMPLES

The present invention will be better understood with reference to the following non-limiting example.

Figure 2:
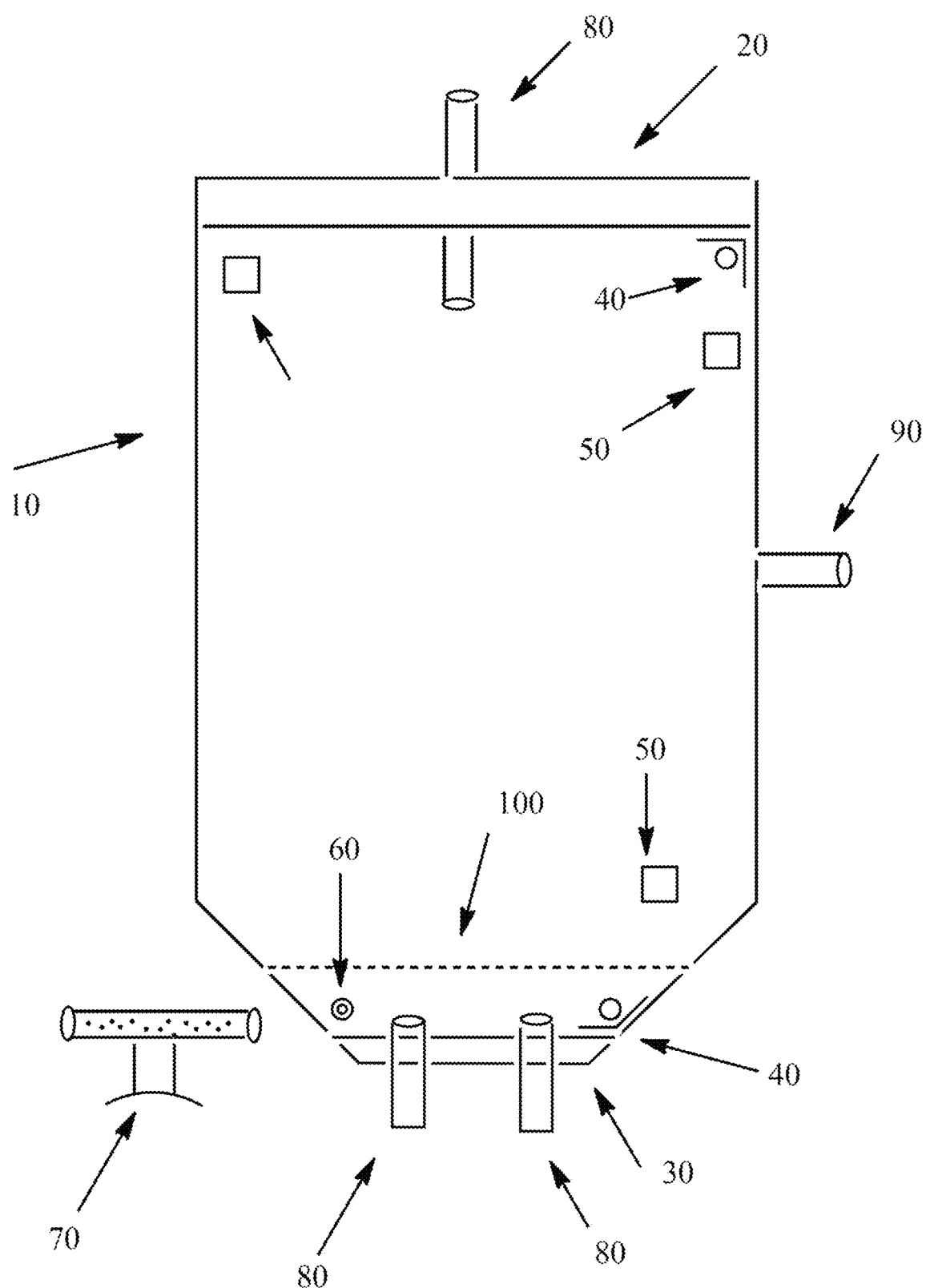
FIG. 2 is a schematic illustration of one embodiment of the retort chamber described herein.

FIG. 2 is a schematic illustration of one embodiment of the retort chamber described herein. The retort chamber (10) includes a top (20), a bottom (30), a hinge (40) at the top and/or the bottom, to enable the user to insert material to be thermally depolymerized and/or to remove inorganic material and other remnants which remain following the thermal depolymerization process, temperature sensors (50) near the top, near the bottom, and between the top and the bottom of the retort chamber, a carriage (60) for receiving a burner (70), two inlet ports (80) near the bottom of the retort chamber, and one inlet port (80) near the top of the retort chamber, and an outlet port (90) between the top and the bottom of the retort chamber. Along the bottom, in line with and above the burner, is a register (100). The material to be thermally depolymerized overlies the register.

In use, material to be thermally depolymerized is introduced to the retort chamber (10), ideally by opening the hinge (40) at the top of the retort chamber (10), which hinge (40) is closed after the material is introduced. Oxygen or air is inserted through one of the bottom inlet ports (80), and the burner (70) is introduced through the carriage (60). The oxygen/air passes through a register (100), which allows for substantially even heating as the burner (70) and oxygen travel along the bottom of the reactor (20) and over the register (100).

The amount of oxygen/air is insufficient to result in rapid combustion of the material to be combusted. Instead, this results in the partial combustion, or smoldering, of the bottom layer of the material to be combusted (such as tires). The temperature at or near the bottom (30) of the retort (10) is monitored using a temperature sensor (50), so as to remain in the range of between about 900 and 1300° F. Water is added to the retort (10) through a second inlet port (80) at or near the bottom of the retort (30). The water may react with iron to form hydrogen and iron oxide, for example, where the material to be thermally depolymerized comprises tires, and the tires comprise steel belts.

As the thermal depolymerization takes place, the temperature in the middle of the retort chamber rises to a desired range, as measured by a second thermal sensor (50), and a thermal depolymerization product is produced. This material exits the retort (10) through an exit port (90).

The temperature at or near the top of the retort (20) can be measured using a third temperature sensor (50).

When the reaction is complete, the retort can be cooled by adding more water through the inlet port (80) at or near the bottom of the retort, and, optionally, through the inlet port (80) at or near the top of the retort (20). Inorganic material and other material that is not consumed in the depolymerization reaction can be removed, for example, by opening a hinge (40) near the bottom of the retort.

Figure 3:
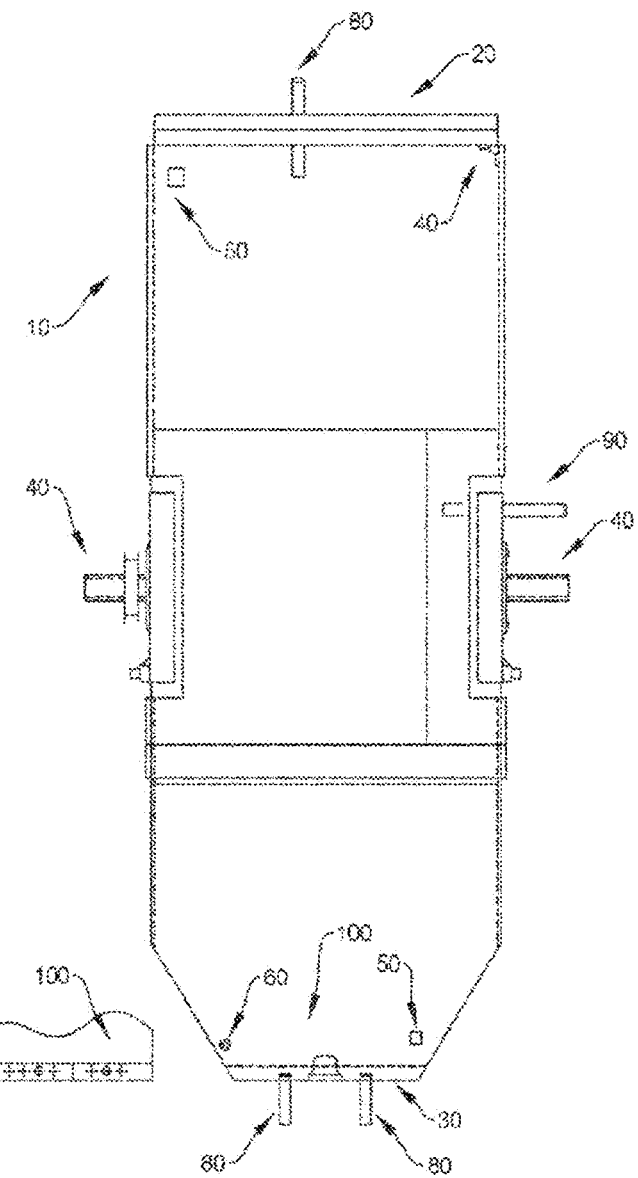
FIG. 3 is a schematic illustration of another embodiment of the retort chamber described herein.

FIG. 3 is a schematic illustration of another embodiment of the retort chamber described herein. In this embodiment, as with the previous embodiment, the retort chamber (10) includes a top (20) and bottom (30), temperature sensors (50), a carriage (60) for a burner (not shown), inlet ports (80) at the bottom (30) and top (20) of the retort (10), an outlet port (90), which in some embodiments is concentric with the hinge (40), and a register (100). However, in addition to hinge (40) at or near the top (20) of the retort (10), there are hinges (40) at or near the middle of the retort chamber (10), which permit the retort (10) to be rotated. In use, the retort is used in substantially the same way as the embodiment shown in FIG. 2. However, when the thermal depolymerization step is completed, the remnants can be removed by opening the top of the retort (20) and rotating the retort (10) using the hinges at or near the middle of the retort (40).

Figure 4:
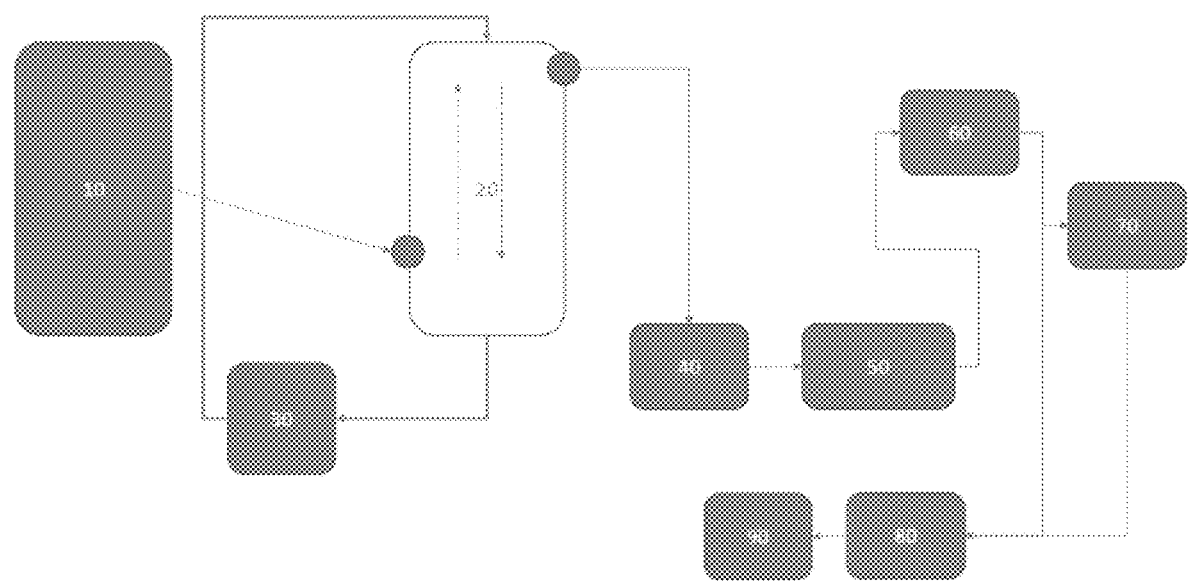
FIG. 4 is a schematic illustration of one embodiment of a product separation unit to collect products as they leave the retort chamber.

FIG. 4 is a schematic illustration of one embodiment of a product isolation unit, which cools the initial gaseous product stream as it leaves the retort chamber, and allows for separation of a gaseous product stream (i.e., products that remain in the gas stream as the temperature is lowered), a liquid product stream, and a particulate product stream. Products leave the retort chamber (10) through the vacuum line or port, and enter the separation chamber (20) at or near the bottom. The gaseous product stream flows upward, and a curtain of water flows downward (depicted with arrows going up and down), cooling the gaseous product stream to a temperature relatively lower than when the gaseous product stream left the retort chamber. For example, the gas stream entering the product separation unit may be at a temperature of between around 60 and around 70° C., and may leave the product separation unit at a temperature between about 45 and 55° C.

The cooled gaseous product stream separates into a product stream that remains gaseous at the relatively lower temperatures, and a product stream that is liquid at the relatively lower temperatures. The liquid product stream flows out of the bottom of the separation chamber (20) to a tank (30), where the organic liquids can be removed, for example, via decantation, and solids removed, for example, via filtration. The water can be recycled to the water curtain, optionally after further cooling the water to a relatively lower temperature. The gaseous product stream flows out through a port at or near the top of the separation chamber, where it flows through a venturi scrubber (40) and an impingement filter (50) to remove the bulk of any remaining particulates, then flows through a vacuum pump array (60), after which it flows through a cyclone separator (70), to remove any remaining particles, and the gases flow through a detonation arrestor (80) and a thermal oxidizer (90), which converts any volatile organic compounds (VOCs) in the gas stream to carbon dioxide and water, so that as the gases leave the product isolation unit and enter the environment, they have been scrubbed of harmful gases, and particulate emissions. If desired, the gases can optionally be sent through a desulfurization unit, not shown.

Figure 5:
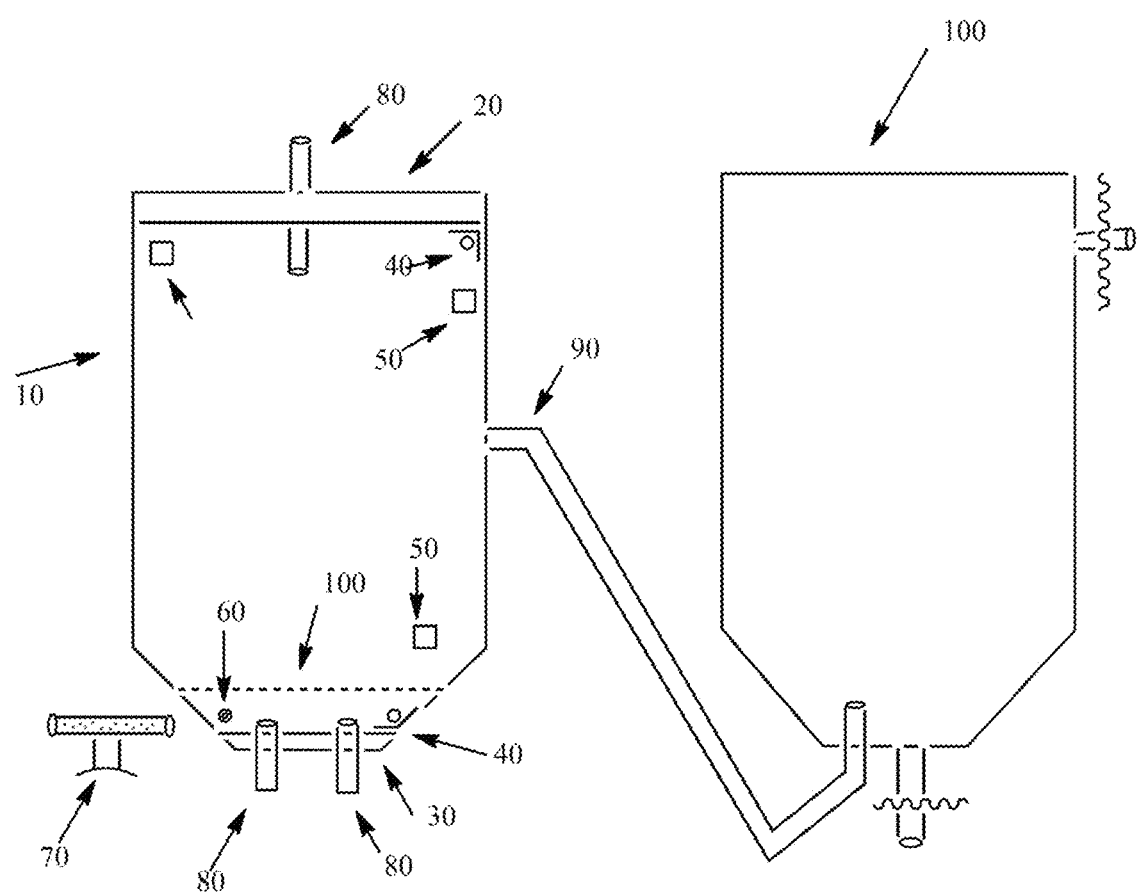
FIG. 5 is a schematic illustration of one embodiment of a retort chamber connected to a product separation unit, where products leave the retort chamber at or near the middle of the retort chamber through a vacuum line, and enter the product separation unit near the bottom.

FIG. 5 is a schematic illustration of the retort chamber attached to the separation chamber of the product isolation unit. Further connections between the separation chamber and other components in the product isolation unit are not shown. The retort chamber (10) is connected, via an outlet port (90) (i.e., a vacuum line or port) to a separation chamber (100) that includes a water curtain. The outlet port is located around 40-60% of the height of the retort chamber, and connects at or near the bottom of the separation chamber. The inlet to the separation chamber is above the bottom, so that the gaseous product mixture does not pass through a pool of water that might collect at the bottom of the chamber as the water drops or droplets in the curtain fall down from the top of the chamber. In certain embodiments, the inlet to the separation chamber is at least 5%, at least 10%, at least 15%, at least 20%, or at least 25% from the bottom of the separation chamber, and, ideally, no more than 15%, no more than 20%, or no more than 25% from the bottom of the separation chamber.

In other embodiments, not shown, the gaseous materials can be passed through a demethanization column, and the $C_{2-4}$ products collected under pressure. The $C_1$ and lower products (methane, carbon dioxide, carbon monoxide, hydrogen, and the like) can be bottled under pressure, if desired, for later use, as an alternative to being flared. Direct release of these gases to the atmosphere is undesirable.

Various publications are cited herein, the disclosures of which are incorporated by reference in their entireties for all purposes.

The present invention is not to be limited in scope by the specific embodiments described herein. Indeed, various modifications of the invention in addition to those described will become apparent to those skilled in the art from the foregoing description and accompanying figures. Such modifications are intended to fall within the scope of the appended claims.

The invention claimed is:

1. A retort chamber comprising:
   a) a top,
   b) a bottom,
   c) a heater at or near the bottom of the retort chamber capable of heating the bottom to a temperature between about 900 and 1300° C.,
   d) two or more inlet ports located at or near the bottom of the retort chamber,
   e) one or more outlet ports located at or near the top of the retort chamber,
   f) temperature monitors at or near the top and bottom of the retort chamber,
   g) a temperature monitor located at a position between about 30 and about 70% of the distance between the top and the bottom of the retort chamber, and
   h) a vacuum line or aspirator located between about 40 and about 60% of the distance between the top and the bottom of the retort chamber, wherein the retort chamber has a cylindrical shape.

2. The retort chamber of claim 1, wherein the heater is a burner placed on a carriage, wherein the carriage is adapted to allow the burner to move along the bottom of the retort chamber.

3. The retort chamber of claim 1, wherein the bottom of the retort chamber comprises a plurality of registers, wherein the registers are spaced so as to provide substantially equal pressure along the entire bottom of the retort, wherein substantially equal means that the pressure along the bottom of the retort chamber does not vary by more than 20%.

4. The retort chamber of claim 1, wherein one or more of the inlet ports is adapted to receive a supply of water to be introduced into the retort chamber.

5. The retort chamber of claim 1, further comprising one or more further inlet ports at or near the top of the retort chamber, wherein the one or more further inlet ports are adapted to receive a supply of water to be introduced into the retort chamber.

6. The retort chamber of claim 1, wherein one or more of the inlet ports is adapted to receive a supply of air or oxygen to be introduced into the retort chamber.

7. The retort chamber of claim 1, wherein the bottom is hinged, and, when open, allows for material to be removed from the retort chamber.

8. The retort chamber of claim 1, wherein the top is hinged, and, when open, allows for material to be inserted into or removed from, the retort chamber.

9. The retort chamber of claim 8, further comprising a hinge with a horizontal axis, adapted to allow the retort chamber to rotate, allowing for material to be removed from the retort chamber when the lid is open and the retort chamber is rotated such that the top of the retort chamber is lower than the bottom of the retort chamber.

10. The retort chamber of claim 1, further comprising a desulfurization unit attached to one of the outlet ports.

11. The retort chamber of claim 1, further comprising a cyclone unit attached to one of the outlet ports, wherein the cyclone unit is adapted to remove particulates from a gaseous product stream exiting the outlet port.

12. The retort chamber of claim 1, further comprising a chilling or condensation unit attached to the vacuum line or aspirator, wherein the chilling or condensation unit is adapted to receive and cool a product stream that is in the gas phase at the temperature at which the product stream enters the chilling or condensation unit, and, when cooled, at least a portion of the product stream is in the liquid phase,
   wherein the vacuum line or aspirator from the retort chamber is attached to the chilling or condensation unit at a position between about 0 and about 20% of the height from the bottom of the chilling or condensation unit.

13. The retort chamber of claim 12, wherein the chilling or condensation unit attached to the vacuum line or aspirator comprises one or more sprayers for providing a curtain of water to cool the product stream in the gas phase, which sprayers are located below the top of the chilling or condensation unit,
   wherein a vacuum line or port is disposed on the chilling or condensation unit between 0 and 4" from the top of the chilling or condensation unit,
   wherein the sprayers are capable of providing a falling curtain of water that can cool the initial product stream to a temperature at which at least a portion of the product stream is in the liquid phase.

14. A process for thermally de-manufacturing tires and/or post-consumer waste product, comprising:
   a) loading the retort chamber of claim 1 with tires and/or post-consumer waste product,
   b) purging the retort chamber of volatiles and air, such that a vacuum in the range of between approximately −0.8 and −200 millibars is present in the retort chamber,
   c) heating a portion of the tires and/or post-consumer waste product at or near the bottom of the retort chamber to a temperature between about 900 and 1300° C., and
   d) thermally depolymerizing the tires and/or post-consumer waste product to form a product stream which exits the retort chamber through one or more of the outlet ports, wherein the product stream is in the gas phase while exiting the retort chamber, while maintaining the temperature in the zone where the products leave the retort chamber at a temperature between about 100 and 280° C.

15. The process of claim 14, wherein the pressure is between about −3 and −8 millibars.

16. The process of claim 14, wherein the temperature is maintained by adding water and/or air or oxygen through two or more of the inlet ports.

17. The process of claim 14, wherein the tires to be thermally de-manufactured comprises steel-belted tires, and wherein water reacts with the steel in the steel-belted tires at a temperature between about 900 and 1300° C. to form hydrogen.

18. The process of claim 17, wherein the tires comprise vulcanized rubber which comprises sulfur-sulfur and/or sulfur-carbon linkages, and the hydrogen breaks the sulfur-sulfur and/or sulfur-carbon linkages in the vulcanized rubber.

19. The process of claim 14, further comprising subjecting the product stream to desulfurization conditions.

20. The process of claim 14, further comprising subjecting the product stream to a cyclone to remove particulates.

21. The process of claim 14, wherein the product stream comprises one or more products which are liquid at room temperature and atmospheric pressure, and one or more products which are gaseous at room temperature and atmospheric pressure, further comprising subjecting the product stream to a chiller or condenser unit, so as to condense a portion of the products which are liquid at room temperature and atmospheric pressure.

22. The process of claim 14, wherein the tires and/or other material being thermally demanufactured undergo a thermal depolymerization reaction in that part of the retort chamber between where the temperature is between about 900 and about 1300° C., and where the temperature is between about 100 and about 280° C.

23. The process of claim 22, wherein the tires being burned at or near the bottom of the retort chamber provide heat energy for the thermal depolymerization step.

24. The process of claim 22, wherein the product composition varies as the temperature of the product stream varies from about 100 to about 280° C., with relatively more of the product composition having a relatively low molecular weight as the temperature is relatively higher, and relatively more of the product composition having a relatively high molecular weight as the temperature is relatively lower.

25. The process of claim 14, wherein the temperature of the thermal depolymerization step, and, accordingly, the product composition, is controlled by adjusting an amount of water and/or air or oxygen through the two or more inlet ports.

26. The process of claim 14, wherein, after the thermal depolymerization step is complete, the retort chamber is cooled by introducing water into the retort chamber through one or more of the inlet ports at or near the top of the retort chamber and/or an inlet port at or near the bottom of the retort chamber.

* * * * *